(12) United States Patent
Naess

(10) Patent No.: US 7,463,549 B2
(45) Date of Patent: Dec. 9, 2008

(54) APPARATUS AND METHOD FOR CARRYING OUT SEISMIC SURVEYS

(75) Inventor: Ole E. Naess, Trondheim (NO)

(73) Assignee: Statoil ASA, Stavanger (NO)

(\*) Notice: Subject to any disclaimer, the term of this patent is extended or adjusted under 35 U.S.C. 154(b) by 0 days.

(21) Appl. No.: 10/867,174

(22) Filed: Jun. 14, 2004

(65) Prior Publication Data

US 2005/0219948 A1    Oct. 6, 2005

(30) Foreign Application Priority Data

Apr. 2, 2004    (GB) .................................. 0407623.8

(51) Int. Cl.
*G01V 1/38*    (2006.01)
(52) U.S. Cl. .......................... 367/23; 367/15; 367/144; 367/153; 367/154; 181/118; 181/120
(58) Field of Classification Search ............. 367/15–16, 367/18–20, 23, 144, 153–154; 181/110, 181/118, 111, 120
See application file for complete search history.

(56) References Cited

U.S. PATENT DOCUMENTS

| | | | | |
|---|---|---|---|---|
| 4,862,422 A | * | 8/1989 | Brac | 367/19 |
| 5,144,588 A | * | 9/1992 | Johnston et al. | 367/16 |
| 6,011,753 A | * | 1/2000 | Chien | 367/21 |
| 6,028,817 A | * | 2/2000 | Ambs | 367/16 |
| 6,301,193 B1 | * | 10/2001 | Martin et al. | 367/16 |
| 6,788,618 B2 | * | 9/2004 | Clayton et al. | 367/13 |
| 6,873,571 B2 | * | 3/2005 | Clayton et al. | 367/144 |
| 2004/0022125 A1 | * | 2/2004 | Clayton et al. | 367/68 |
| 2004/0228214 A1 | * | 11/2004 | Tulett | 367/15 |

FOREIGN PATENT DOCUMENTS

| | | | |
|---|---|---|---|
| EP | 0018053 | * | 4/1980 |
| EP | 1403662 | * | 9/2003 |
| WO | WO01161380 | * | 8/2001 |
| WO | WO02073241 | * | 9/2002 |

\* cited by examiner

*Primary Examiner*—Jack W Keith
*Assistant Examiner*—Scott A Hughes
(74) *Attorney, Agent, or Firm*—Patterson, Thuente, Skaar & Christensen, P.A.

(57) ABSTRACT

A 4D seismic source comprising a series of sub-arrays of guns on flotation devices. Each flotation device has a GPS device. For firing, the guns in the e.g. three sub-arrays identified as being closest to the desired firing location are selected.

12 Claims, 2 Drawing Sheets

APPARATUS AND METHOD FOR CARRYING OUT SEISMIC SURVEYS

RELATED APPLICATION

This application claims priority to UK Application No. 0407623.8 filed Apr. 2, 2004.

1. Technical Field

The present invention relates to an apparatus and method for conducting seismic surveys and is more specifically concerned with a seismic source arrangement and a method of generating a seismic event. The invention is particularly (though not exclusively) suitable for marine seismic applications, and even more particularly to 4D seismic surveys, but again, not exclusively.

2. Background Art

In a conventional marine seismic application, a source is towed behind a vessel. A series of receivers can either also be towed or may be fixed to the seabed. Typically, the source will comprise a series of flexible or rigid flotation devices each carrying an array of compressed air guns. The flotation devices will extend generally parallel with each other behind the vessel.

It is desirable, particularly in 4D-seismic surveys, to shoot only along preplanned lines and to avoid feathering (streamer deviation) as much as possible. In this regard, the use of steerable streamers helps considerably in reducing feathering. This improves the repeatability which can be obtained on the streamer recording side.

However, experience shows that it is very difficult to keep the seismic source on a preplanned line during the actual surveying. The reasons for this include waves and currents pushing the source sideways in a sometimes erratic and unpredictable manner.

Unfortunately, when the source is located 10-15 or even up to 20 m or more off line, many of the benefits of controlling the receiver positions are lost. One single misplaced shot, if recorded, will have a detrimental effect on typically more than a thousand recordings (channels). It is virtually impossible to repeat these random variations in source position when reshooting the survey for 4D. Hence, any such deviation in source position which can not be duplicated in the subsequent survey will degrade the repeatability and therefore the quality of the information obtainable on a reservoir.

Several attempts have been made to reduce and compensate for positional deviations in streamers for seismic receiver cables. Most notably, the use of steering devices has been found to reduce the amount of deviation from a pre-planned course.

SUMMARY OF THE INVENTION

It is therefore an object of the present invention to provide a method and apparatus for generation of seismic events, which provides accurate positioning (placement) of the seismic source.

According to one aspect of the invention, there is provided apparatus for generating seismic events which comprises: a seismic source comprising an array of individual seismic signal generation elements arranged in a series of generally linear sub-arrays; a position determining device associated with each sub-array; and a control device; the control device being arranged to compare the positions of each array, as determined by the respective position determining device, with a predetermined desired position for emitting a seismic event, to select the sub-array most closely located to the desired position, and to generate a seismic event using the selected sub-array.

According to another aspect of the invention, there is provided a method of generating seismic events which comprises: deploying an array of individual seismic generation elements as a series of generally linear sub-arrays; determining the position of each sub-array using a positioning determining device associated with each sub-array; comparing the determined positions of each sub-array with a predetermined desired position for a seismic event; selecting the sub-array most closely located to the desired position; and generating a seismic event using the selected sub-array.

Thus, by selecting the sub-array closest to the desired source position, the maximum lateral error will be half the distance between adjacent sub-arrays (provided there is a sufficient number of sub-arrays).

Preferably, there are from 3 to 6 sub-arrays, more preferably 6 to 10, for example 9.

Preferably, each sub-array comprises a flotation device on which the generation elements are mounted. Preferably, the generation elements comprise compressed air guns, e.g. sleeve guns.

Preferably, the position determining devices are located generally at the centre of their respective sub-arrays, or there may be two or more spaced position determining devices. Preferably, the position determining devices are GPS devices.

In a preferred embodiment, the control device is arranged to select two or more sub-arrays which together are centred most closely on the desired position and to generate a seismic event using the selected sub-arrays. The source, and hence the number of subarrays, to be used are selected from modelling and other considerations for the individual seismic survey. A suitable number of sub-arrays to select could be three. In this way, the source would be the guns on those selected sub-arrays, and these guns would be centred on the desired source position and would be co-ordinated to fire simultaneously, or with individual delays to form a desired signal.

Preferably, the apparatus further comprises depth indicators associated with each sub-array, pressure indicators associated with each sub-array, and hydrophones associated with the generating elements.

This arrangement can conveniently be towed behind a marine vessel which could be a submarine but is preferably a surface vessel. The vessel can be directed along the desired path for a series of seismic shots. Conveniently, the vessel will follow a series of parallel paths.

Preferably, the airguns are towed at a depth of from 2 to 20 meters, more preferably from 5 to 10 meters. Preferably, the sub-arrays are spaced apart by a distance in the range of from 5 to 20 meters, preferably 8 to 15 meters, for example 10 meters. In this way, the seismic event would be centred on a position which cannot be greater than 5 m away from the desired location.

Typically, one or several compressors supply high pressure air into a tank onboard the vessel which always contain air at the same pressure. The tank pressure essentially regulates the output from the compressors. The tank is generally referred to as the pressure manifold. From this tank, umbilicals with high pressure air are connected to the subarrays in the water. Each gun is loaded automatically with constant pressure air from its respective umbilical after having been fired.

Preferably, several seismic events are generated along a line. Preferably, the events are generated along a first series of parallel lines. For 4D surveying, the seismic event or events are repeated after the elapse of a period of time.

In one preferred embodiment, the source comprises an array of 48 sleeve guns arranged in six sub-arrays. Each sub-array is a flotation device with a first pair of guns, a second pair of guns 4.3 m along the streamer, a fifth gun 3.3 m further along, a sixth gun 2.8 m further along, a seventh gun 2.5 m further along and an eighth gun 2.2 meters further along. The subarrays are spaced apart by 10 m. When used in accordance with the invention, not all of the guns are fired at once, only, for example, the guns in three of the subarrays.

A preferred system for 4D seismic surveys in accordance with the invention may therefore have the following characteristics:
- a seismic source consisting of an excess of identical sub-arrays is towed behind a vessel;
- an equal number of sub-arrays is fired at each planned source point on the preplanned seismic line;
- only those sub-arrays that are most centred on the planned source point are fired;
- firing is controlled also by the crossline source position and not only by the inline midpoint between source and receiver (CMP-point) as is usual today;
- all sub-arrays and therefore the centre of the total source is positioned by GPS; and
- loading the guns with pressurised air is controlled by manifolds in such a manner as to make the 4D source (i.e. the correctly positioned sub-arrays) ready to fire within less than 7-8 seconds.

The characteristics are preferably all selected in combination, but can be selected individually or in any combination.

The invention also extends to a survey report generated using the apparatus and/or method of the invention.

The invention may be carried into practice in various ways and some embodiments will now be described by way of example with reference to the accompanying drawings, in which:

DETAILED DESCRIPTION OF THE DRAWINGS

Figure 1:
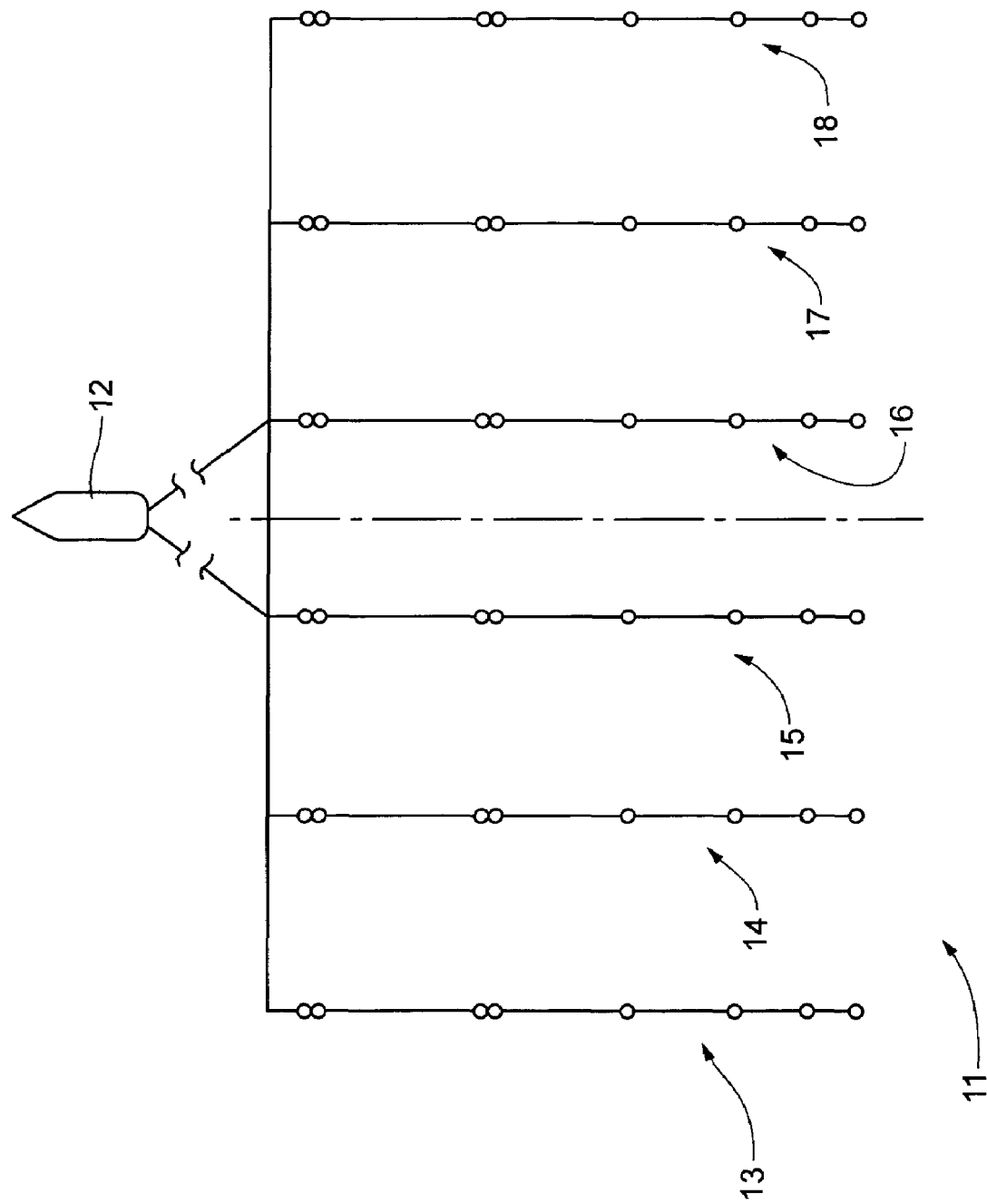
FIG. 1 is a schematic plan view of an arrangement in accordance with the invention.

As shown in FIG. 1, the seismic source 11 is towed behind a marine vessel 12. The source 11 is an array of airguns arranged in six sub-arrays 13, 14, 15, 16, 17, 18. Each sub-array is in the form of a flotation device which carries eight compressed air sleeve guns as shown in more detail in FIG. 2. The sub-arrays are spaced 10 m apart.

Figure 2:
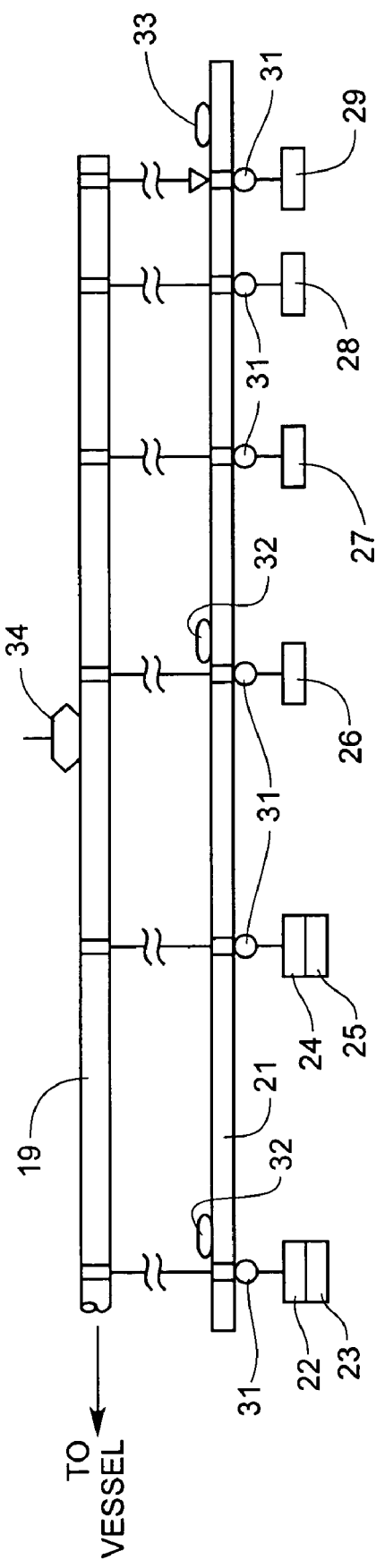
FIG. 2 is a schematic side view of a sub-array shown in FIG. 1.

FIG. 2 shows one of the sub-arrays, for example, the sub-array 13, though the others are all similar. The sub-array 13 comprises a flotation device 19 from which the eight guns are suspended and which supports a high pressure air supply manifold or umbilical 21.

Nearest the vessel 12 there is a first two-gun cluster 22, 23 and 4.3 m further along the umbilical 21, there is a second two-gun cluster 24, 25. There are then four further individual guns 26, 27, 28 and 29 spaced along the umbilical 21 at spacings of 3.3 m, 2.8 m, 2.5 m and 2.3 m respectively. The clusters have their component guns arranged in an over/under fashion with the vertical distance between the gun ports set to maximise the bubble suppression effects of clustered guns.

A near-field hydrophone 31 is mounted 1 m above each gun station (one phone is used per cluster). In addition, three depth sensors 32 (fore, middle and aft) and a high pressure sensor 33 are mounted on the umbilical 21. All the data from these sensors are 31, 32, 33 are transmitted to the vessel 12 for input into the position systems and/or recording to tape.

The flotating device 19 has a GPS device 34 at a position about half way along its length.

The flotating devices 19 are lined up parallel to each other with a 10 m crossline separation between them. This separation has been chosen so as to attenuate the acoustic radiation emitted in the crossline direction. The 10 m sub-array separation results in a total array width of 50 m.

In use, the GPS devices 34 sense the midpoint position of each flotating device 19. One of the flotating devices 19 will be identified as being nearest the desired source firing position. The guns selected for firing will then be those in the sub-array of the nearest identified flotating device 19 and those in the sub-arrays on either side. Thus, if the flotating device in sub-array 14 is identified as being the nearest located to the desired source position for firing, the guns in sub-arrays 13, 14 and 15 will be fired.

Similarly, if sub-array 15 is identified as the nearest to the desired source position, the guns in sub-arrays 14, 15 and 16 will be fired. If sub-array 16 is identified as the nearest, the guns in sub-arrays 15, 16 and 17 will be fired, and so on.

As some sub-arrays may not be used (fired) for extended time intervals, there may be a need to control these so that any sub-array is pressurised and ready to fire at any desired source point. This may be difficult in practice. It is therefore possible to tolerate a one shot delay before changing source between consecutive shots i.e. the decision on which source to fire must be made early enough to pressurise the guns in the involved sub-arrays. Such a one shot delay should not be a serious limitation of the proposed system.

The invention claimed is:

1. A method of conducting a seismic survey at a predetermined desired position, the method comprising:
   towing a seismic source comprising an excess of individual seismic generation elements behind a marine vessel;
   deploying the individual seismic generation elements as a series of equally spaced generally linear sub-arrays over an area including the said predetermined desired position;
   determining the position of each sub-array using a positioning determining device associated with each sub-array;
   comparing the determined positions of each sub-array with the said predetermined desired position;
   selecting a sub-array most closely located to the said predetermined desired position; and
   generating a desired signal using only the seismic generation elements of the selected sub-array and the nearest sub-array to the selected sub-array, while not selecting the seismic generation elements from the disregarded sub-arrays so as to minimize lateral error.

2. A method according to claim 1, wherein each sub-array comprises a flotation device on which the generation elements are mounted.

3. A method according to claim 1, wherein the sub-arrays are towed at a depth of from 2 to 20 meters.

4. A method according to claim 1, wherein the sub-arrays are spaced apart by a distance in the range of from 5 to 20 meters.

5. A method according to claim 1, wherein two sub-arrays which are centered most closely on the selected sub-array are selected and used to generate the signal in cooperation with the selected sub-array while more distant sub-arrays are disregarded and are not used to generate the seismic event.

6. A method according to claim 1, wherein each sub-array has the capability to create a plurality of seismic events spaced along a line.

7. A method according to claim 6, wherein the several seismic events are generated along a first series of parallel lines.

8. A method according to claim 7, wherein the several seismic events are generated along a second series of parallel lines which cross the first series.

9. A method according to claim 1, wherein the seismic survey is repeated after the elapse of a period of time.

10. A method according to claim 1 wherein the position determining device is a GPS device.

11. A method according to claim 1 wherein the desired signal is created by a simultaneous firing of all of the selected seismic generation elements.

12. A method according to claim 5 wherein the desired signal is created by a delayed firing pattern that includes independently firing the selected sub-array and independently firing the two nearest sub-arrays within the same pass over the desired source position.

* * * * *